US006221984B1

(12) United States Patent
Kersting et al.

(10) Patent No.: US 6,221,984 B1
(45) Date of Patent: *Apr. 24, 2001

(54) RANDOM PROPYLENE COPOLYMER

(75) Inventors: Meinolf Kersting, Neustadt; Werner Schöne, Schriesheim; Franz Langhauser, Ruppertsberg, all of (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/082,056

(22) Filed: May 21, 1998

(30) Foreign Application Priority Data

May 28, 1997 (DE) ................ 197 22 569

(51) Int. Cl.⁷ ............... C08F 4/44; C08F 210/06; C08F 210/08
(52) U.S. Cl. ............. 526/124.3; 526/129; 526/130; 526/348.6; 526/916; 502/104; 502/117
(58) Field of Search ............... 526/348, 348.6, 526/916, 160, 943, 124.6, 124.9, 129, 130, 124.3

(56) References Cited

U.S. PATENT DOCUMENTS

| | | | |
|---|---|---|---|
| 4,415,718 | * 11/1983 | Miyoshi et al. | 526/348.6 |
| 4,483,917 | 11/1984 | Archer et al. | |
| 4,857,613 | 8/1989 | Zolk et al. | |
| 5,247,031 | * 9/1993 | Kioka et al. | 526/125 |
| 5,288,824 | 2/1994 | Kerth et al. | |
| 5,455,303 | 10/1995 | Panagopoulos | 525/95 |
| 5,744,567 | * 4/1998 | Huffer et al. | 526/348.6 |
| 5,895,803 | * 4/1999 | Deblauwe et al. | 526/348.6 |

FOREIGN PATENT DOCUMENTS

| | | |
|---|---|---|
| 61958/96 | 2/1997 | (AU). |
| 14 523 | 8/1980 | (EP). |
| 23 425 | 2/1981 | (EP). |
| 45 865 | 2/1982 | (EP). |
| 45 977 | 2/1982 | (EP). |
| 83 473 | 8/1983 | (EP). |
| 171 200 | 2/1986 | (EP). |
| 195 497 | 9/1986 | (EP). |
| 450 456 | 10/1991 | (EP). |
| 778 295 | 6/1997 | (EP). |
| 780432 | 6/1997 | (EP). |
| 2 111 066 | 6/1983 | (GB). |

* cited by examiner

*Primary Examiner*—David W. Wu
*Assistant Examiner*—R. Harlan
(74) *Attorney, Agent, or Firm*—Keil & Weinkauf

(57) ABSTRACT

Random copolymers of propylene with ethylene and at least one $C_4$–$C_{10}$-alk-1-ene, having a melting point, determined by the DSC method, of less than or equal to 135° C., are obtainable by polymerization of propylene, ethylene and at least one $C_4$–$C_{10}$-alk-1-ene in the absence of a liquid reaction medium from the gas phase at from 50 to 100° C. and a pressure of from 15 to 40 bar in the presence of a Ziegler-Natta catalyst system comprising
a) a titanium-containing solid component comprising at least one halogen-containing magnesium compound, an electron donor and an inorganic oxide as support,
b) an aluminum compound and
c) a further electron donor compound,
wherein the ratio of the partial pressures of propylene and ethylene is set to from 20:1 to 100:1 and the ratio of the partial pressures of the $C_4$–$C_{10}$-alk-1-ene(s) and ethylene is set to from 2.5:1 to 20:1. A process for preparing such random copolymers is also provided, and they can be used in films, fibers or moldings.

3 Claims, No Drawings

RANDOM PROPYLENE COPOLYMER

The present invention relates to random copolymers of propylene with ethylene and at least one $C_4$–$C_{10}$-alk-1-ene, which have a melting point, determined by the DSC method, of less than or equal to 135° C. and are obtainable by polymerization of propylene, ethylene and at least one $C_4$–$C_{10}$-alk-1-ene in the absence of a liquid reaction medium from the gas phase at from 50 to 100° C. and a pressure of from 15 to 40 bar in the presence of a Ziegler-Natta catalyst system comprising
a) a titanium-containing solid component comprising at least one halogen-containing magnesium compound, an electron donor and an inorganic oxide as support,
b) an aluminum compound and
c) a further electron donor compound,
wherein the ratio of the partial pressures of propylene and ethylene is set to from 20:1 to 100:1 and the ratio of the partial pressures of the $C_4$–$C_{10}$-alk-1-ene(s) and ethylene is set to from 2.5:1 to 20:1.

The present invention further relates to a process for preparing such random copolymers and to their use in films, fibers or moldings.

Ziegler-Natta catalyst systems are known, inter alia, from EP-B 014 523, EP-A 023 425, EP-A 045 975 and EP-A 195 497. These systems are used particularly for the polymerization of $C_2$–$C_{10}$-alk-1-enes and comprise, inter alia, compounds of polyvalent titanium, aluminum halides and/or aluminum alkyls, plus electron donor compounds, in particular silicon compounds, ethers, carboxylic esters, ketones and lactones which are used both in the titanium component and as cocatalyst.

The preparation of Ziegler-Natta catalysts is usually carried out in two steps. Firstly, the titanium-containing solid component is prepared, and this is subsequently reacted with the cocatalyst. The polymerization is then carried out using the catalysts obtained in this way.

U.S. Pat. No. 4,857,613 and U.S. Pat. No. 5,288,824 describe catalyst systems of the Ziegler-Natta type which comprise not only a titanium-containing solid component and an aluminum compound but also organic silane compounds as external electron donor compounds. The catalyst systems obtained in this way display, inter alia, a good productivity and give polymers of propylene having a high stereospecificity, ie. a high isotacticity, a low chlorine content and a good morphology, ie. a low proportion of fines. Copolymers of propylene with other alk-1-enes which are obtainable using such catalyst systems are described in EP-A 450 456.

Some fields of application for polymers of propylene require the polymers to have, inter alia, a high stiffness and only low proportions of xylene-soluble polymer particles. This applies, for example, to food packaging films which are produced from such propylene polymers. The copolymers of propylene known from EP-A 450 456 do not meet these requirements to a sufficient extent.

EP-A 778 295 describes propylene copolymers with copolymerized $C_2$–$C_{10}$-alk-1-enes, where, for the case of the copolymers of propylene, ethylene and 1-butene, the ratio of the partial pressures of 1-butene and ethylene is held in the range from 0.02:1 to 2:1.

Furthermore, U.S. Pat. No. 4,483,917 discloses a process for preparing terpolymers of propylene, ethylene and other α-olefins. The terpolymers obtained by this process do have a low content of soluble material, but their sealability is still in need of improvement. In addition, the terpolymers obtained have a relatively high chlorine content.

It is an object of the present invention to develop, starting from the copolymers of propylene described in EP-A 450 456, improved copolymers which do not have the above-mentioned disadvantages.

We have found that this object is achieved by the random copolymers of propylene with ethylene and at least one further $C_4$–$C_{10}$-alk-1-ene defined in the introduction.

For the purposes of the present invention, $C_4$–$C_{10}$-alk-1-enes are linear or branched alk-1-enes, in particular 1-butene, 1-pentene, 1-hexene, 1-heptene or 1-octene or a mixture of these comonomers; preference is given to using 1-butene.

The copolymers of the present invention have a melting point which is less than or equal to 135° C. However, in general, the melting point is not below 80° C. For the purposes of the present invention, the melting point is the melting point determined in accordance with ISO 3146 by means of differential scanning calorimetry (DSC) using a heating rate of 10° C. per minute.

According to the invention, the random copolymers are obtained in the presence of a Ziegler-Natta catalyst system which consists essentially of a titanium-containing solid component a) and, as cocatalysts, an aluminum compound b) and a further electron donor compound c).

To prepare the titanium-containing solid component a), the titanium compounds used are generally the halides or alkoxides of trivalent or tetravalent titanium; it is here also possible to use titanium alkoxy halogen compounds or mixtures of various titanium compounds. Examples of suitable titanium compounds are $TiBr_3$, $TiBr_4$, $TiCl_3$, $TiCl_4$, $Ti(OCH_3)Cl_3$, $Ti(OC_2H_5)Cl_3$, $Ti(O\text{-iso-}C_3H_7)Cl_3$, $Ti(O\text{-n-}C_4H_9)Cl_3$, $Ti(OC_2H_5)Br_3$, $Ti(O\text{-n-}C_4H_9)Br_3$, $Ti(OCH_3)_2Cl_2$, $Ti(OC_2H_5)_2Cl_2$, $Ti(O\text{-n-}C_4H_9)_2Cl_2$, $Ti(OC_2H_5)_2Br_2$, $Ti(OCH_3)_3Cl$, $Ti(OC_2H_5)_3Cl$, $Ti(O\text{-n-}C_4H_9)_3Cl$ $Ti(OC_2H_5)_3Br$, $Ti(OCH_3)_4$, $Ti(OC_2H_5)_4$ or $Ti(O\text{-n-}C_4H_9)_4$. Preference is given to using titanium compounds which contain chlorine as halogen. Likewise preferred are the titanium halides which consist of only titanium and halogen, especially the titanium chlorides and in particular titanium tetrachloride.

The titanium-containing solid component a) comprises at least one or a mixture of various halogen-containing magnesium compounds. For the purposes of the present invention, halogens are chlorine, bromine, iodine or fluorine or mixtures of two or more halogens, with chlorine or bromine and in particular chlorine being preferred. The halogen-containing magnesium compounds are either added directly in the preparation of the titanium-containing solid component a) or formed in the preparation thereof. Magnesium compounds which are suitable for preparing the titanium-containing solid component a) are especially the magnesium halides, in particular the chlorides or bromides, or magnesium compounds from which the halides can be obtained in a customary manner, eg. by reaction with halogenating agents. Examples of such compounds are magnesium alkyls, magnesium aryls, magnesium alkoxy compounds or magnesium aryloxy compounds or Grignard compounds. Suitable halogenating agents are, for example, halogens, hydrogen halides, $SiCl_4$ or $CCl_4$ and preferably chlorine or hydrogen chloride.

Examples of halogen-free compounds of magnesium which are suitable for preparing the titanium-containing solid component a) are diethylmagnesium, di-n-propylmagnesium, diisopropylmagnesium, di-n-butylmagnesium, di-sec-butylmagnesium, di-tert-butylmagnesium, diamylmagnesium, n-butylethylmagnesium, n-butyl-sec-butylmagnesium, n-butyloctylmagnesium, diphenylmagnesium, diethoxymagnesium, di-n-propyloxymagnesium, diisopropyloxymagnesium, di-n-butyloxymagnesium, di-sec-butyloxymagnesium, di-tert-butyloxymagnesium, diamyloxymagnesium, n-butyloxyethoxymagnesium, n-butyloxy-sec-butyloxymagnesium, n-butyloxyoctyloxymagnesium or diphenoxymagnesium. Among these, particular preference is given to n-butylethylmagnesium or n-butyloctylmagnesium.

Examples of Grignard compounds are methylmagnesium chloride, ethylmagnesium chloride, ethylmagnesium bromide, ethylmagnesium iodide, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, hexylmagnesium chloride, octylmagnesium chloride, amylmagnesium chloride, isoamylmagnesium chloride, phenylmagnesium chloride and phenylmagnesium bromide.

Apart from magnesium dichloride or magnesium dibromide, particular preference is given to using the di($C_1$–$C_{10}$-alkyl)magnesium compounds for preparing the titanium-containing solid component a).

In addition, the titanium-containing solid component a) comprises electron donor compounds, for example monofunctional or polyfunctional carboxylic acids, carboxylic anhydrides or carboxylic esters, also ketones, ethers, alcohols, lactones or organophosphorus or organosilicon compounds.

The electron donor compounds used within the titanium-containing solid component are preferably carboxylic acid derivatives and, in particular, phthalic acid derivatives of the formula (II)

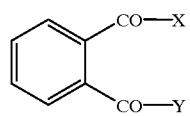

(II)

where X and Y are each a chlorine or bromine atom or a $C_1$–$C_{10}$-alkoxy radical or together represent oxygen in an anhydride function. Particularly preferred electron donor compounds are phthalic esters where X and Y are each a $C_1$–$C_8$-alkoxy radical, for example methoxy, ethoxy, n-propyloxy, isopropyloxy, n-butyloxy, sec-butyloxy, isobutyloxy or tert-butyloxy. Examples of phthalic esters which are preferably used are diethyl phthalate, di-n-butyl phthalate, diisobutyl phthalate, di-n-pentyl phthalate, di-n-hexyl phthalate, di-n-heptyl phthalate, di-n-octyl phthalate or di-2-ethylhexyl phthalate.

Further preferred electron donor compounds within the titanium-containing solid component are diesters of 3- or 4-membered, substituted or unsubstituted cycloalkyl-1,2-dicarboxylic acids and also monoesters of substituted benzophenone-2-carboxylic acids or substituted benzophenone-2-carboxylic acids themselves. The hydroxy compounds used for forming these esters are the alkanols customary in esterification reactions, for example $C_1$–$C_{15}$-alkanols or $C_5$–$C_7$-cycloalkanols which may in turn bear one or more $C_1$–$C_{10}$-alkyl groups as substituents, also $C_6$–$C_{10}$-phenols.

It is also possible to use mixtures of various electron donor compounds.

In the preparation of the titanium-containing solid component a), use is generally made of from 0.05 to 2.0 mol, preferably from 0.2 to 1.0 mol, of the electron donor compounds per mol of magnesium compound.

In addition, the titanium-containing solid component a) comprises at least one inorganic oxide as support. As a rule, the support used is a finely divided inorganic oxide which has a mean particle diameter of from 5 to 200 μm, preferably from 20 to 70 μm. For the purposes of the present invention, the mean particle diameter is the median value of the particle size distribution determined by Coulter Counter analysis.

The finely divided inorganic oxide is preferably composed of primary particles which have a mean particle diameter of from 1 to 20 μm, in particular from 1 to 5 μm. The primary particles are porous, granular oxide particles which are generally obtained from a hydrogel of the inorganic oxide by milling. It is also possible to sieve the primary particles before they are further processed.

Furthermore, the inorganic oxide which is preferably used also has voids and channels which have a mean diameter of from 0.1 to 20 μm, in particular from 1 to 15 μm, and a macroscopic proportion by volume in the total particle in the range from 5 to 30%, in particular in the range from 10 to 30%.

The mean particle diameter of the primary particles and the macroscopic proportion by volume of the voids and channels in the inorganic oxide is advantageously determined by image analysis using scanning electron microscopy or electron probe microanalysis, in each case on particle surfaces and on particle cross sections of the inorganic oxide. The micrographs obtained are measured and the mean particle diameter of the primary particles and the macroscopic proportion by volume of the voids and channels is determined therefrom.

The inorganic oxide which is preferably used can be obtained, for example, by spray drying the milled hydrogel which for this purpose is mixed with water or an aliphatic alcohol. Such finely divided inorganic oxides are also commercially available.

The finely divided inorganic oxide also usually has a pore volume of from 0.1 to 10 $cm^3$/g, preferably from 1.0 to 4.0 $cm^3$/g, and a specific surface area of from 10 to 1000 $m^2$/g, preferably from 100 to 500 $m^2$/g. For the purposes of the present invention, these values are those determined by mercury porosimetry in accordance with DIN 66133 and by nitrogen adsorption in accordance with DIN 66131.

It is also possible to use an inorganic oxide whose pH, ie. the negative logarithm to the base ten of the proton concentration, is in the range from 1 to 6.5 and in particular in the range from 2 to 6.

Particularly useful inorganic oxides are the oxides of silicon, aluminum, titanium or one of the metals of main group I or II of the Periodic Table. Particularly preferred oxides are aluminum oxide, magnesium oxide, sheet silicates and especially silicon oxide (silica gel). It is also possible to use mixed oxides such as aluminum silicates or magnesium silicates.

The inorganic oxides used as support have water present on their surface. Some of this water is physically bound by adsorption and some of it is chemically bound in the form of hydroxyl groups. The water content of the inorganic oxide can be reduced or completely eliminated by thermal or chemical treatment. In the case of a chemical treatment, customary desiccants such as $SiCl_4$, chlorosilanes or aluminum alkyls are generally used. The water content of suitable inorganic oxides is from 0 to 6% by weight. Preference is given to using an inorganic oxide in the form which is commercially available, without further treatment.

The magnesium compound and the inorganic oxide are preferably present within the titanium-containing solid component a) in such amounts that from 0.1 to 1.0 mol, in particular from 0.2 to 0.5 mol, of the magnesium compound is present per mol of the inorganic oxide.

In the preparation of the titanium-containing solid component a), use is generally also made of $C_1$–$C_8$-alkanols such as methanol, ethanol, n-propanol, isopropanol, n-butanol, sec-butanol, tert-butanol, isobutanol, n-hexanol, n-heptanol, n-octanol or 2-ethylhexanol or mixtures thereof. Preference is given to using ethanol.

The titanium-containing solid component can be prepared by methods known per se. Examples are described, inter alia, in EP-A 45 975, EP-A 45 977, EP-A 86 473, EP-A 171 200, GB-A 2 111 066, U.S. Pat. No. 4,857,613 and U.S. Pat. No. 5,288,824.

In the preparation of the titanium-containing solid component a), the following two-stage method is preferably employed:

In the first stage, the inorganic oxide is first reacted in an inert solvent, preferably a liquid alkane or an aromatic hydrocarbon, e.g. toluene or ethylbenzene, with a solution of the magnesium-containing compound, after which this mixture is allowed to react, generally while stirring, for from 0.5 to 5 hours at from 10 to 120° C. Subsequently, usually while stirring continually, a halogenating agent is added in an at least two-fold, preferably at least five-fold, molar excess, based on the magnesium-containing compound. After from about 30 to 120 minutes, the titanium compound and the electron donor compound are added to this reaction product at from 10 to 150° C., using from 1 to 15 mol, preferably from 2 to 10 mol, of the titanium compound and from 0.1 to 1 mol, in particular from 0.3 to 0.7 mol, of the electron donor compound per mol of magnesium in the solid obtained from the first stage. This mixture is allowed to react for at least 10 minutes, preferably at least 30 minutes, at from 10 to 150° C., in particular from 60 to 130° C., generally while stirring. The solid thus obtained is subsequently filtered off and washed with a $C_7$–$C_{10}$-alkylbenzene, preferably with ethylbenzene.

In the second stage, the solid obtained from the first stage is extracted at from 100 to 150° C. with excess titanium tetrachloride or an excess of a solution of titanium tetrachloride in an inert solvent, preferably a $C_7$–$C_{10}$-alkylbenzene, with the solvent containing at least 5% by weight of titanium tetrachloride. The extraction is generally carried out for at least 30 minutes. The product is then washed with a liquid alkane until the titanium tetrachloride content of the washings is less than 2% by weight.

Suitable aluminum compounds b) are trialkylaluminums as well as compounds in which an alkyl group is replaced by an alkoxy group or by a halogen atom, for example by chlorine or bromine. The alkyl groups can be identical or different and may be linear or branched. Preference is given to using trialkyl aluminum compounds whose alkyl groups each have from 1 to 8 carbon atoms, for example trimethylaluminum, triethylaluminum, triisbbutylaluminum, trioctylaluminum or methyldiethylaluminum or mixtures thereof.

Apart from the aluminum compound b), use is made, as further cocatalyst, of electron donor compounds c) such as monofunctional or polyfunctional carboxylic acids, carboxylic anhydrides or carboxylic esters, also ketones, ethers, alcohols, lactones, as well as organophosphorus and organosilicon compounds. These electron donor compounds c) can be identical to or different from the electron donor compounds used for preparing the titanium-containing solid component a). Preferred electron donor compounds c) are organosilicon compounds of the formula (I)

$$R^1_n Si(OR^2)_{4-n} \qquad (I)$$

where $R^1$ are identical or different and are each a $C_1$–$C_{20}$-alkyl group, a 5- to 7-membered cycloalkyl group which may in turn bear $C_1$–$C_{10}$-alkyl as substituent, a $C_6$–$C_{18}$-aryl group or a $C_6$–$C_{18}$-aryl-$C_1$–$C_{10}$-alkyl group, $R^2$ are identical or different and are each a $C_1$–$C_{20}$-alkyl group and n is one of the integers 1, 2 or 3. Particular preference is given to those compounds in which $R^1$ is a $C_1$–$C_8$-alkyl group or a 5- to 7-membered cycloalkyl group and $R^2$ is a $C_1$–$C_4$-alkyl group and n is 1 or 2.

Among these compounds, particular mention may be made of dimethoxydiisopropylsilane, dimethoxyisobutylisopropylsilane, dimethoxydiisobutylsilane, dimethoxydicyclopentylsilane, dimethoxyisopropyl-tert-butylsilane, dimethoxyisobutyl-sec-butylsilane and dimethoxyisopropyl-sec-butylsilane.

The compounds b) and c) acting as cocatalysts can be allowed to act either individually, in succession in any order or simultaneously on the titanium-containing solid component a). This is usually carried out at from 0 to 150° C., in particular from 20 to 90° C., and pressures of from 1 to 100 bar, in particular from 1 to 40 bar.

The cocatalysts b) and c) are preferably used in such an amount that the atomic ratio of aluminum from the aluminum compound b) to titanium from the titanium-containing solid component a) is from 10:1 to 800:1, in particular from 20:1 to 200:1, and the molar ratio of the aluminum compound b) to the electron donor compound c) is from 1:1 to 250:1, in particular from 10:1 to 80:1.

The preparation of the novel random copolymers of propylene with ethylene and at least one $C_4$–$C_{10}$-alk-1-ene can be carried out in the customary reactors for the polymerization of alk-1-enes, either batchwise or preferably continuously, inter alia as a suspension polymerization or preferably as a gas-phase polymerization. Suitable reactors are, inter alia, continuously operated stirred reactors containing a fixed bed of finely divided polymer which is usually kept in motion by means of suitable devices such as stirrers. Of course, the reaction can also be carried out in a plurality of reactors connected in series.

The process, which is likewise subject matter of the present invention, leading to the random copolymers of the present invention is carried out by polymerizing propylene together with ethylene and at least one $C_4$–$C_{10}$-alk-1-ene in the absence of a liquid reaction medium from the gas phase at from 50 to 100° C., preferably from 60 to 90° C., pressures of from 15 to 40 bar, preferably from 20 to 35 bar, and usually at mean residence times of from 0.5 to 5 hours, preferably from 0.5 to 3 hours.

The comonomers propylene, ethylene and the $C_4$–$C_{10}$-alk-1-ene(s) are used in such amounts that the partial pressure ratio of propylene to ethylene is in the range from 20:1 to 100:1, in particular from 40:1 to 90:1, and the partial pressure ratio of the $C_4$–$C_{10}$-alk-1-ene(s) to ethylene is in the range from 2.5:1 to 20:1 and in particular from 3.5:1 to 10:1.

The molar mass of the random copolymers of propylene can be controlled and adjusted over a wide range by addition of regulators customary in polymerization technology, for example hydrogen. Furthermore, it is possible to make concomitant use of inert solvents such as toluene or hexane, inert gases such as nitrogen or argon and relatively small amounts of polypropylene powder. The random propylene copolymers of the present invention preferably have molar masses (weight average) of from 20,000 to 500,000 g/mol. Their melt flow rates (MFRS) at 230° C. under a weight of 2.16 kg, in accordance with ISO 1133, are in the range from 0.1 to 100 g/10 min, in particular in the range from 0.5 to 50 g/10 min.

The novel random copolymers of propylene with ethylene and at least one $C_4$–$C_{10}$-alk-1-ene differ from the previously known random propylene copolymers in, in particular, further reduced proportions of xylene-soluble material, ie. an improved stereospecificity, and a higher stiffness. The copolymers of the present invention display improved flowability of the granules. The sealing properties of the random copolymers of the present invention are significantly improved, ie. they have a lower sealing commencement temperature. Furthermore, the BOPP films (biaxially oriented polypropylene films) produced from the copolymers of the present invention have higher gloss and lower haze, ie. better transparency.

Owing to their good use properties, the random propylene copolymers of the present invention are particularly suitable for producing films, fibers or moldings.

EXAMPLES

Examples 1 to 3 and Comparative Examples A and B

The Results Shown in the Table Were Determined as Follows:

The ethylene content and the 1-butene content were determined on polymer granules using $^{13}C$-NMR spectroscopy.

To determine the proportions of xylene-soluble material, 5 g of polymer were placed in 500 ml of distilled xylene (isomer mixture) which had been heated beforehand to 100° C. The mixture was subsequently heated to the boiling point of xylene and held at this temperature for 60 minutes. It was subsequently cooled to 5° C. over a period of 20 minutes using a cooling bath and then rewarmed to 20° C. This temperature was held for 30 minutes, after which the precipitated polymer was filtered off. 100 ml of the filtrate were measured out exactly and the solvent was removed on a rotary evaporator. The residue was dried for 2 hours at 80° C./200 Torr and weighed after cooling.

The proportion of xylene-soluble material is given by $$XS = \frac{g \times 500 \times 100}{G \times V}$$

Xs=proportion of xylene-soluble material, in %
g=amount found
G=amount of product weighed out
V=Volume of filtrate used The melting point was determined by means of differential scanning calorimetry (DSC) at a heating rate of 10° C. per minute in accordance with ISO 3146.

The G modulus was determined in accordance with ISO 6721-2.

The ball indentation hardness reported is the ball indentation hardness H 132/30 in accordance with ISO 2039-1.

50 μm thick flat films were produced for testing the film properties.

The gloss was determined in accordance with ISO/IEC 2813.

The haze was determined in accordance with ASTM D-1003.

To determine the sealing commencement temperature, hot-sealed specimens (sealing seam 200 mm×50 mm) were produced using a Brugger model NDS sealing apparatus by sealing a film at different temperatures by means of two heatable sealing bars at a sealing pressure of 0.35 N/cm² and a sealing time of 0.5 seconds. Test strips having a width of 15 mm were cut from the sealed specimens. The hot-seal seam strength, ie. the force required to separate the test strips, was determined on a tensile testing machine at 200 mm/min, with the plane of the sealing seam being at right angles to the pulling direction. The minimum sealing temperature (sealing commencement temperature) is the temperature at which a sealing seam strength of 1 N/15 mm is achieved. The lower the sealing commencement temperature, the better the sealing performance of a specimen.

The flowability of the granules was determined in accordance with DIN 53492 (bottom diameter of the funnel=25 mm).

To determine the mean particle diameter of the silica gel used, the particle size distribution of the silica gel particles was determined by Coulter Counter analysis and the median value was calculated therefrom.

The pore volume was determined both by mercury porosimetry in accordance with DIN 66133 and by nitrogen adsorption in accordance with DIN 66131.

The specific surface area was determined by nitrogen adsorption in accordance with DIN 66131.

The mean particle size of the primary particles and the macroscopic proportion by volume of the voids and channels of the silica gel used were determined by image analysis using scanning electron microscopy or electron probe microanalysis, in each case on particle surfaces and on particle cross sections of the silica gel.

Example 1

Preparation of the Titanium-containing Solid Component $a_1$)

In a first stage, a finely divided silica gel which had a mean particle diameter of 30 μm, a pore volume of 1.5 cm³/g and a specific surface area of 260 m²/g was admixed with a solution of n-butyloctylmagnesium in n-heptane, using 0.3 mol of the magnesium compound per mol of $SiO_2$. The finely divided silica gel additionally had a mean particle size of the primary particles of 3–5 μm and voids and channels having a diameter of 3–5 μm. The macroscopic proportion by volume of the voids and channels in the total particle was about 15%. The solution was stirred for 45 minutes at 95° C., then cooled to 20° C., after which a 10-fold molar amount, based on the organomagnesium compound, of hydrogen chloride was introduced. After 60 minutes, the reaction product was admixed while stirring continuously with 3 mol of ethanol per mol of magnesium. This mixture was stirred for 0.5 hour at 80° C. and subsequently admixed with 7.2 mol of titanium tetrachloride and 0.5 mol of di-n-butyl phthalate, in each case based on 1 mol of magnesium. The mixture was subsequently stirred for 1 hour at 100° C., the solid thus obtained was filtered off and washed a number of times with ethylbenzene.

The solid product obtained in this way was extracted for 3 hours at 125° C. with a 10% strength by volume solution of titanium tetrachloride in ethylbenzene. The solid product was then separated from the extractant by filtration and washed with n-heptane until the washings contained only 0.3% by weight of titanium tetrachloride.

The titanium-containing solid component contained
3.5% by weight of Ti
7.4% by weight of Mg
28.2% by weight of Cl.

Polymerization

The polymerization was carried out in a vertically stirred gas-phase reactor having a utilizable capacity of 800 l in the presence of hydrogen as molecular weight regulator at 70°

C. under a pressure of 20 bar. The reactor contained a stirred fixed bed of finely divided polymer.

A gaseous mixture of propylene, ethylene and 1-butene was introduced into the gas-phase reactor, with the ratio of the partial pressure of propylene to that of ethylene being 72:1 and the ratio of the partial pressure of 1-butene to that of ethylene being 3.9:1. This monomer mixture was continuously polymerized at a mean residence time of 2.8 hours by means of the titanium-containing solid component $a_1$), using 4.3 g/h of the titanium-containing solid component $a_1$) plus 250 mmol/h of triethylaluminum and 25 mmol/h of dimethoxyisobutylisopropylsilane as cocatalysts.

This gave a random propylene-ethylene-1-butene copolymer having a melt flow rate (HLMR) of 116 g/10 min (at 230° C. and 21.6 kg in accordance with ISO 1133). The product was subsequently degraded peroxidically to a melt flow rate (MFR) of 4.7 g/10 min (at 230° C. and 2.16 kg in accordance with ISO 1133). The further polymer data are shown in the table below.

Comparative Example A

Using a method similar to Example 1, polymerization was carried out using the same catalyst system under the same polymerization conditions in a vertically stirred 800 l gas-phase reactor, but the ratio of the partial pressure of propylene to that of ethylene was 38:1 and the ratio of the partial pressure of 1-butene to that of ethylene was 0.88:1.

This gave a random propylene-ethylene-1-butene copolymer having a melt flow rate (HLMR) of 105 g/10 min (at 230° C. and 21.6 kg in accordance with ISO 1133). The product was subsequently degraded peroxidically to a melt flow rate (MFR) of 5.0 g/10 min (at 230° C. and 2.16 kg in accordance with ISO 1133). The further polymer data are shown in the table below.

Example 2

The procedure of Example 1 according to the present invention was repeated, carrying out the polymerization under identical conditions except that the ratio of the partial pressure of propylene to that of ethylene was set to 74:1 and the ratio of the partial pressure of 1-butene to that of ethylene was set to 4.5:1.

This gave a random propylene-ethylene-1-butene copolymer having a melt flow rate (HLMR) of 102 g/10 min (at 230° C. and 21.6 kg in accordance with ISO 1133). The product was subsequently degraded peroxidically to a melt flow rate (MFR) of 4.9 g/10 min (at 230° C. and 2.16 kg in accordance with ISO 1133). The further polymer data are shown in the table below.

Example 3

Using the titanium-containing solid component $a_1$), a gaseous mixture of propylene, ethylene and 1-butene was polymerized in a vertically stirred gas-phase reactor having a utilizable capacity of 12.5 m³ in the presence of hydrogen as molecular weight regulator at 75° C. under a pressure of 20 bar. The reactor contained a stirred fixed bed of finely divided polymer.

The monomer feed was regulated such that in the gas-phase reactor the ratio of the partial pressure of propylene to that of ethylene was 75:1 and the ratio of the partial pressure of 1-butene to that of ethylene was 5:1. This monomer mixture was continuously polymerized at a mean residence time of 2.6 hours by means of the titanium-containing solid component $a_1$), using 0.2 kg of triethylaluminum and 25 g of dimethoxyisobutylisopropylsilane as catalyst constituents per 1000 kg of propylene copolymer.

This gave a random propylene-ethylene-1-butene copolymer having a melt flow rate (HLMR) of 128 g/10 min (at 230° C. and 21.6 kg in accordance with ISO 1133). The product was subsequently degraded peroxidically to a melt flow rate (MFR) of 5.0 g/10 min (at 230° C. and 2.16 kg in accordance with ISO 1133). The further polymer data are shown in the table below.

Comparative Example B

Using a method similar to Example 3, polymerization was carried out using the same catalyst system under the same polymerization conditions in a vertically stirred 12.5 m³ gas-phase reactor, but the ratio of the partial pressure of propylene to that of ethylene was 25:1 and the ratio of the partial pressure of 1-butene to that of ethylene was 0.65:1.

This gave a random propylene-ethylene-1-butene copolymer having a melt flow rate (HLMR) of 112 g/10 min (at 230° C. and 21.6 kg in accordance with ISO 1133). The product was subsequently degraded peroxidically to a melt flow rate (MFR) of 5.2 g/10 min (at 230° C. and 2.16 kg in accordance with ISO 1133). The further polymer data are shown in the table below.

TABLE

|  | Example 1 | Comparative Example A | Example 2 | Example 3 | Comparative Example B |
|---|---|---|---|---|---|
| Ethylene content of the polymer [% by weight] | 2.0 | 4.0 | 2.0 | 2.6 | 3.9 |
| 1-Butene content of the polymer [% by weight] | 5.6 | 2.6 | 7.2 | 6.8 | 2.5 |
| Proportion of xylene-soluble material [% by weight] | 6.3 | 9.8 | 6.8 | 7.9 | 10.9 |
| DSC melting point [° C.] | 133.4 | 132.0 | 131.8 | 128.5 | 129.3 |
| G modulus [MPa] | 398 | 320 | 340 | 340 | 280 |
| Ball indentation hardness [MPa] |  |  | 36 | 37 | 33 |
| Gloss on flat film (50 μm) [%] |  |  | 116 | 116 | 87 |
| Haze on flat film (50 μm) [%] |  |  | 1.1 | 0.9 | 3.2 |
| Sealing commencement temperature [° C.] |  |  | 112 | 110 | 115 |
| Flowability [25 mm. g/s] | 63 | 57 | 65 | 67 | 55 |

A comparison between Examples 1 to 3 according to the present invention and Comparative Examples A and B makes it clear that the random propylene copolymers of the present invention have lower proportions of xylene-soluble material, improved flowability of the granules and increased stiffness and hardness (higher G modulus and ball indentation hardness). Furthermore, the films produced from the copolymers of the present invention have improved film properties (gloss, haze and especially a lower sealing commencement temperature).

We claim:

1. A process for preparing a random copolymer of propylene with ethylene and at least one $C_4$-$C_{10}$-alk-1-ene, which has a melting point, determined by a DSC method, of less than or equal to 135° C., by polymerization of propylene, ethylene and at least one $C_4$-$C_{10}$-alk-1-ene in the absence of a liquid reaction medium from the gas phase at from 50 to 100° C. and a pressure of from 15 to 40 bar in the presence of a Ziegler-Natta catalyst system comprising a) a titanium-containing solid component comprising at least one halogen-containing magnesium compound, an electron donor and an inorganic oxide as support, b) an aluminum compound and c) a further electron donor compound, wherein the ratio of the partial pressures of propylene and ethylene is set to from 20:1 to 100:1 and the ratio of the partial pressures of the $C_4$–$C_{10}$-alk-1-ene(s) and ethylene is set to from 2.5:1 to 20:1.

2. A process as claimed in claim 1, wherein the support used in the titanium-containing solid component is an inorganic oxide which has a mean particle diameter of from 5 to 200 $\mu$m, a mean particle diameter of the primary particles of from 1 to 20 $\mu$m and voids and channels which have a mean diameter of from 1 to 20 $\mu$m and a macroscopic proportion by volume in the total particle in the range from 5 to 30%.

3. A process as claimed in claim 1, wherein the polymerization is carried out at a mean residence time of from 0.5 to 3 hours.

* * * * *